(12) United States Patent
Swaminathan et al.

(10) Patent No.: US 9,084,287 B2
(45) Date of Patent: Jul. 14, 2015

(54) DUAL DOMAIN CAMPING WITH A SINGLE RADIO UE

(71) Applicant: QUALCOMM Incorporated, San Diego, CA (US)

(72) Inventors: Arvind Swaminathan, San Diego, CA (US); Srinivasan Balasubramanian, San Diego, CA (US); Kurt William Otte, Boulder, CO (US); Bhupesh Manoharlal Umatt, San Diego, CA (US); Vanitha Aravamudhan Kumar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 193 days.

(21) Appl. No.: 13/762,217

(22) Filed: Feb. 7, 2013

(65) Prior Publication Data
US 2013/0201890 A1    Aug. 8, 2013

Related U.S. Application Data

(60) Provisional application No. 61/596,713, filed on Feb. 8, 2012, provisional application No. 61/641,176, filed on May 1, 2012.

(51) Int. Cl.
| H04W 4/00 | (2009.01) |
| H04W 88/06 | (2009.01) |
| H04W 48/16 | (2009.01) |
| H04W 48/18 | (2009.01) |

(52) U.S. Cl.
CPC .............. *H04W 88/06* (2013.01); *H04W 48/16* (2013.01); *H04W 48/18* (2013.01)

(58) Field of Classification Search
None
See application file for complete search history.

(56) References Cited

U.S. PATENT DOCUMENTS

| 8,068,835 | B2 | 11/2011 | Parekh et al. | |
| 2010/0202429 | A1* | 8/2010 | Chin et al. | 370/342 |
| 2010/0202430 | A1* | 8/2010 | Chin et al. | 370/342 |
| 2010/0284333 | A1 | 11/2010 | Shirota et al. | |
| 2010/0330992 | A1* | 12/2010 | Bhattacharjee et al. | 455/436 |
| 2011/0003590 | A1* | 1/2011 | Yoon et al. | 455/432.1 |
| 2011/0217969 | A1* | 9/2011 | Spartz et al. | 455/422.1 |
| 2011/0299491 | A1 | 12/2011 | Jang et al. | |
| 2012/0015653 | A1 | 1/2012 | Paliwal et al. | |
| 2012/0034910 | A1 | 2/2012 | Fang et al. | |
| 2013/0044621 | A1* | 2/2013 | Jung et al. | 370/252 |
| 2013/0150026 | A1* | 6/2013 | Ekici et al. | 455/426.1 |

OTHER PUBLICATIONS

3GPP TS 36.300 V11.0.0., "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, vol. RAN WG2, No. V11.0.0, Dec. 20, 2011, pp. 1-194.
International Search Report and Written Opinion—PCT/US2013/025420—ISA/EPO—May 15, 2013.

* cited by examiner

*Primary Examiner* — Chi H Pham
*Assistant Examiner* — Fahmida Chowdhury
(74) *Attorney, Agent, or Firm* — Seyfarth Shaw LLP

(57) ABSTRACT

A method for 1x/LTE dual domain camping with a single radio UE is described. The method includes adaptively sharing a first receive chain and a second receive chain between a first radio access technology (RAT) modem and a second RAT modem of the single radio UE.

44 Claims, 12 Drawing Sheets

DUAL DOMAIN CAMPING WITH A SINGLE RADIO UE

CROSS-REFERENCE TO RELATED APPLICATIONS

The present application claims the benefit of U.S. Provisional Patent Application No. 61/596,713 filed on Feb. 8, 2012, in the names of A. Swaminathan et al. and U.S. Provisional Patent Application No. 61/641,176 filed on May 1, 2012, in the names of A. Swaminathan et al., the disclosures of which are expressly incorporated by reference herein in their entireties.

BACKGROUND

1. Field

Aspects of the present disclosure relate generally to wireless communication systems, and more particularly to dual domain camping with a single receiver/transmitter user equipment (UE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies are adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP).

LTE technology is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. As the demand for mobile broadband access continues to increase, however, there exists a need for further improvements in LTE technology. Preferably, these improvements should be applicable to other multi-access technologies and the telecommunication standards that employ these technologies. Research and development continue to advance LTE technology not only to meet the growing demand for mobile broadband access, but to advance and enhance the user experience with mobile communications.

SUMMARY

According to one aspect of the present disclosure, a method for 1x/LTE dual domain camping with a single radio UE is described. The method includes adaptively sharing a first receive chain and a second receive chain between a first radio access technology (RAT) modem and a second RAT modem of the single radio UE.

In another aspect, an apparatus for 1x/LTE dual domain camping with a single radio UE is described. The apparatus includes at least one processor; and a memory coupled to the at least one processor. The processor(s) is configured to adaptively sharing a first receive chain and a second receive chain between a first radio access technology (RAT) modem and a second RAT modem of the single radio UE.

In a further aspect, a computer program product for 1x/LTE dual domain camping with a single radio UE is described. The computer program product includes a non-transitory computer-readable medium having program code recorded thereon. The computer program product has program code to adaptively sharing a first receive chain and a second receive chain between a first radio access technology (RAT) modem and a second RAT modem of the single radio UE.

In another aspect, an apparatus for 1x/LTE dual domain camping with a single radio UE is described. The apparatus includes means for means for operating the single radio UE. The apparatus further includes means for adaptively sharing a first receive chain and a second receive chain between a first radio access technology (RAT) modem and a second RAT modem of the single radio UE.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
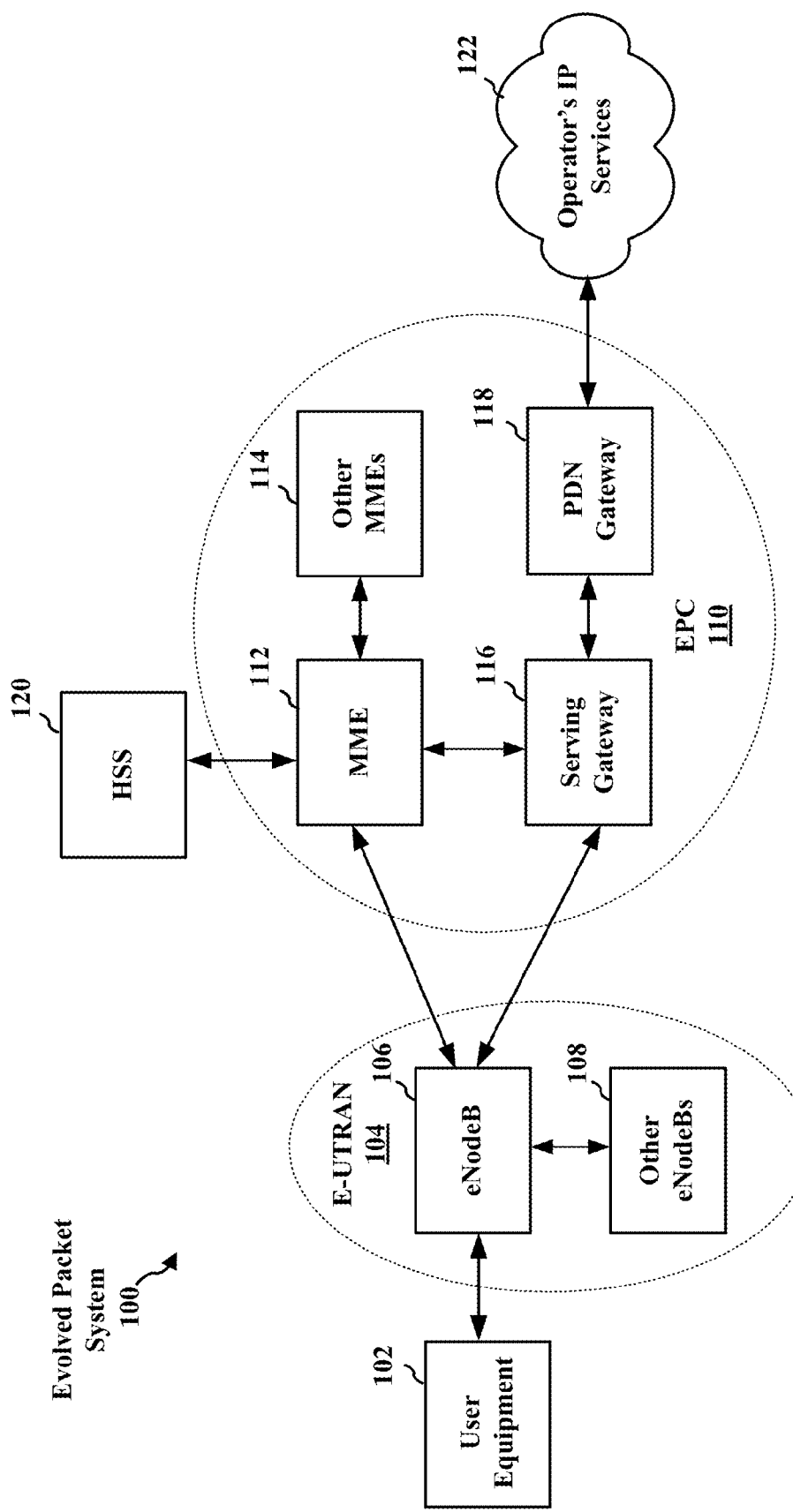
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100, which may be an LTE/-A network, in which 1x/LTE dual domain camping with a single radio UE may be performed, according to one aspect of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an Si interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
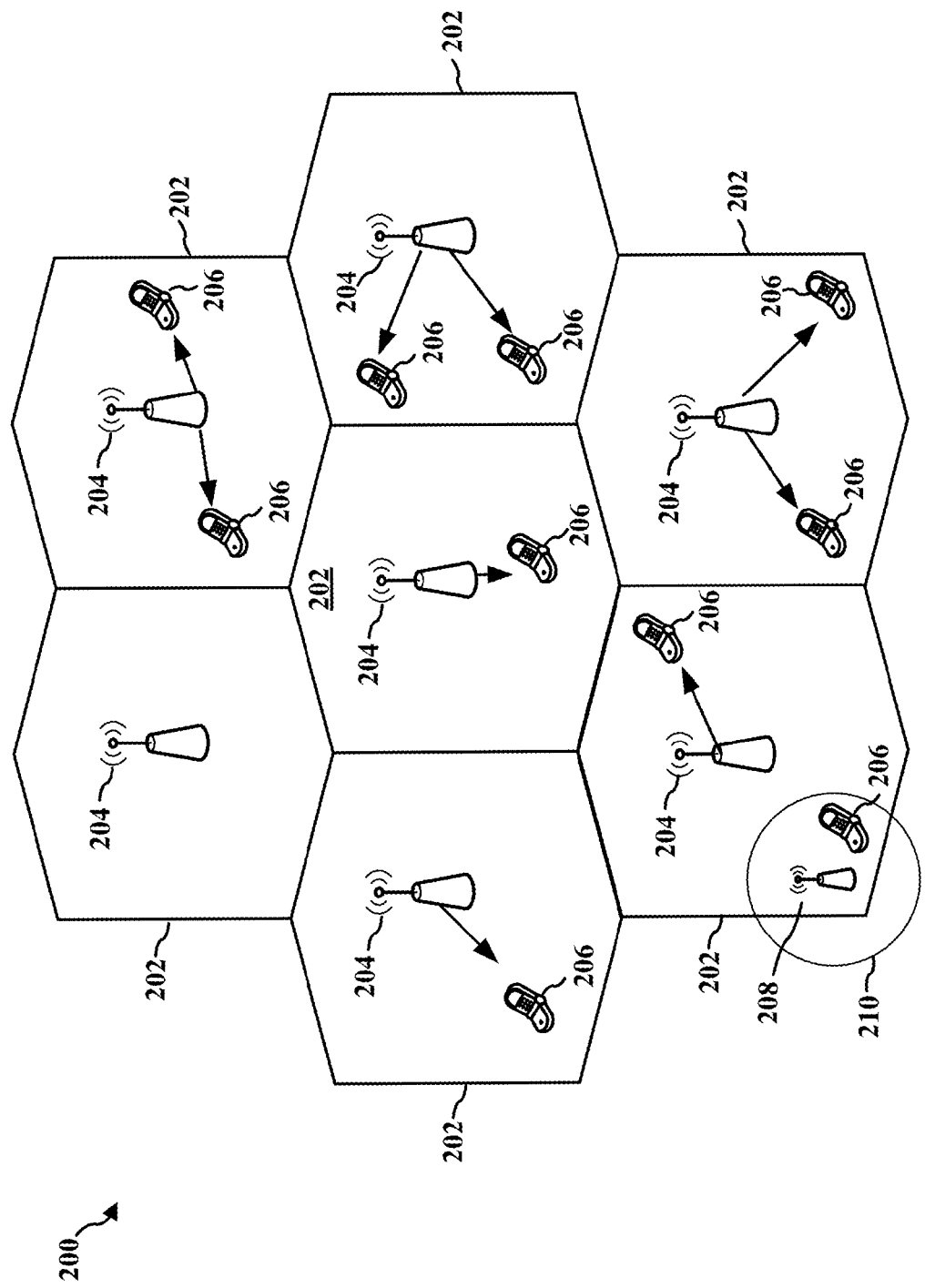
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
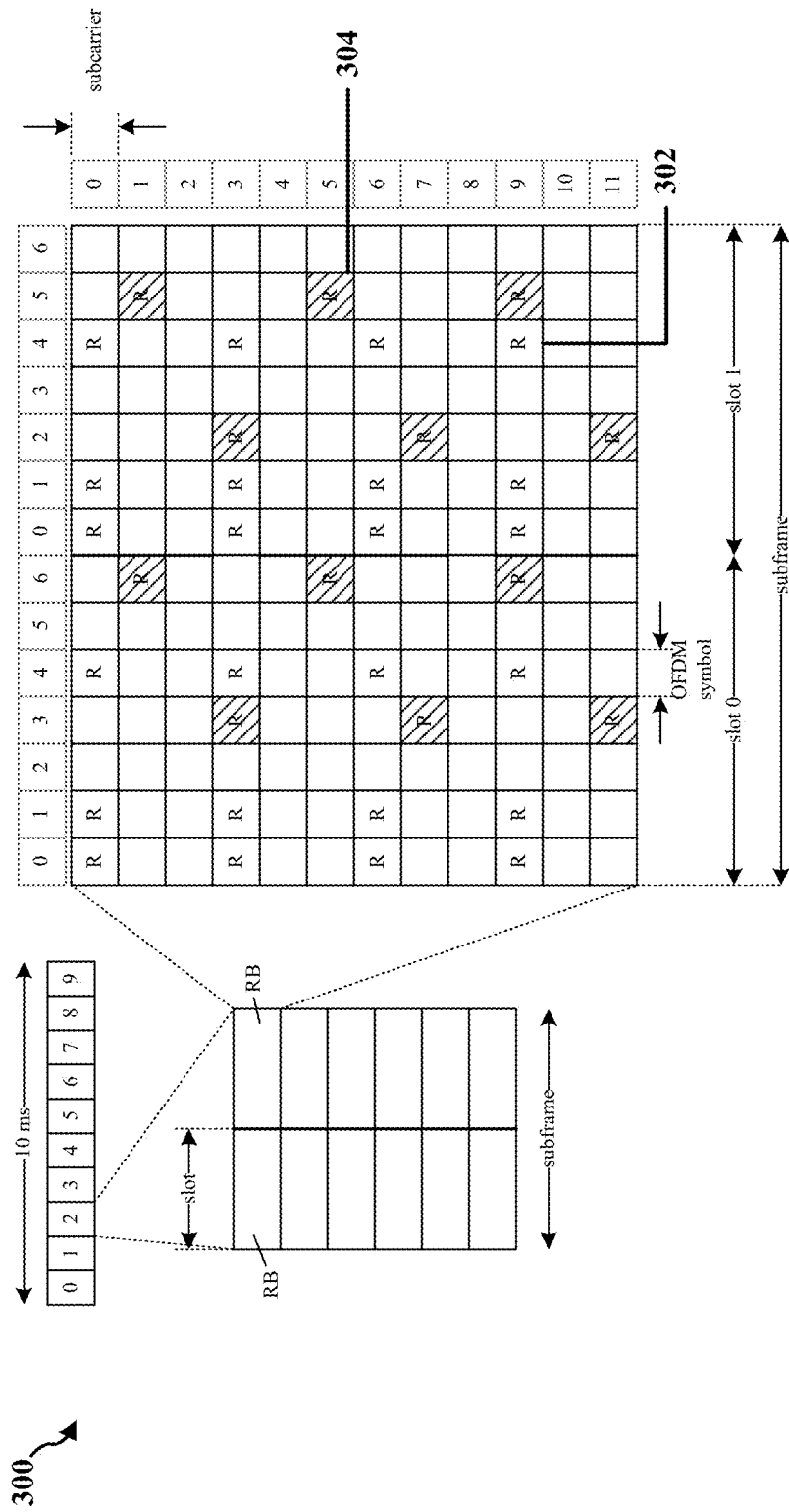
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
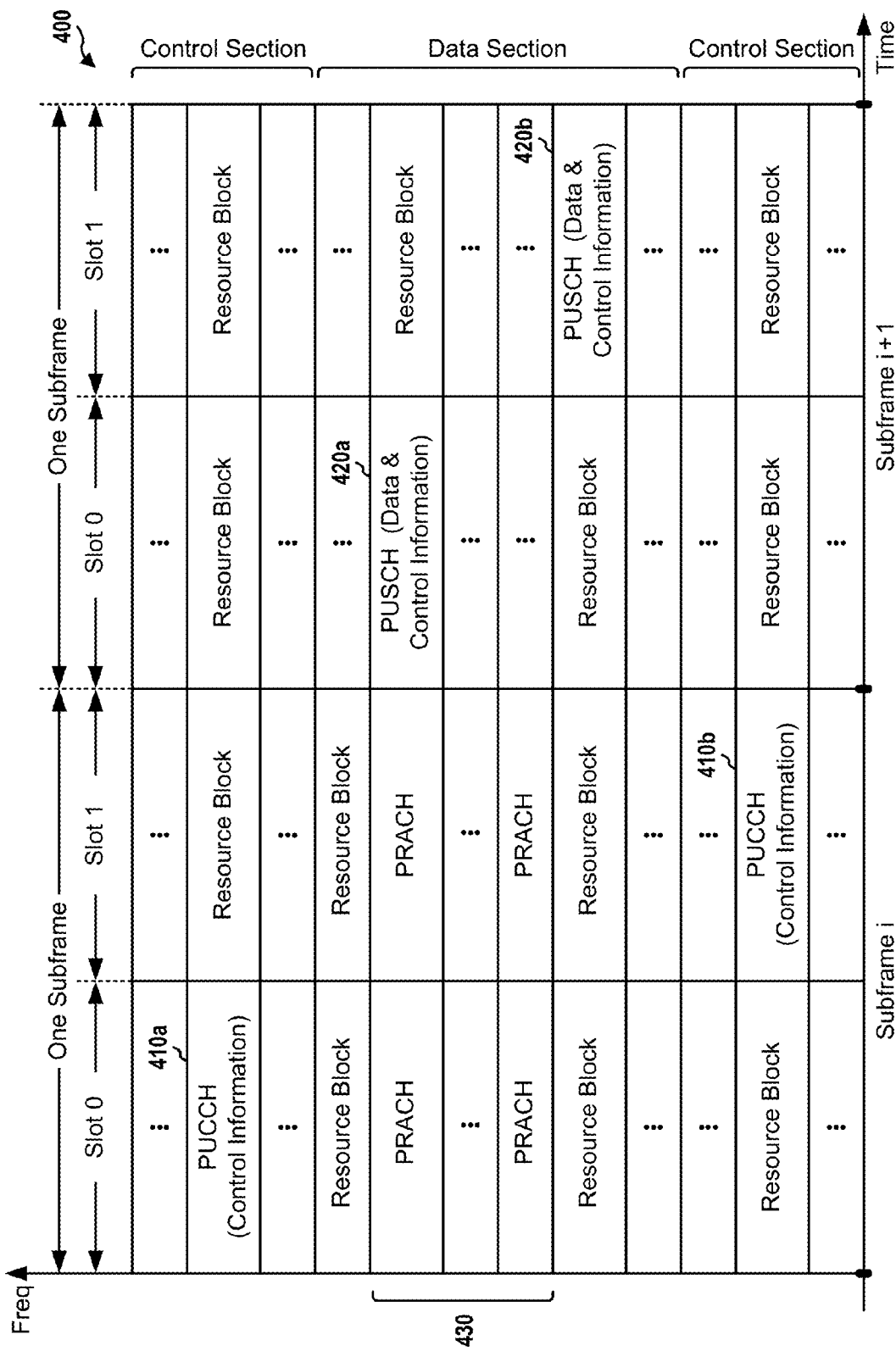
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section.

An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
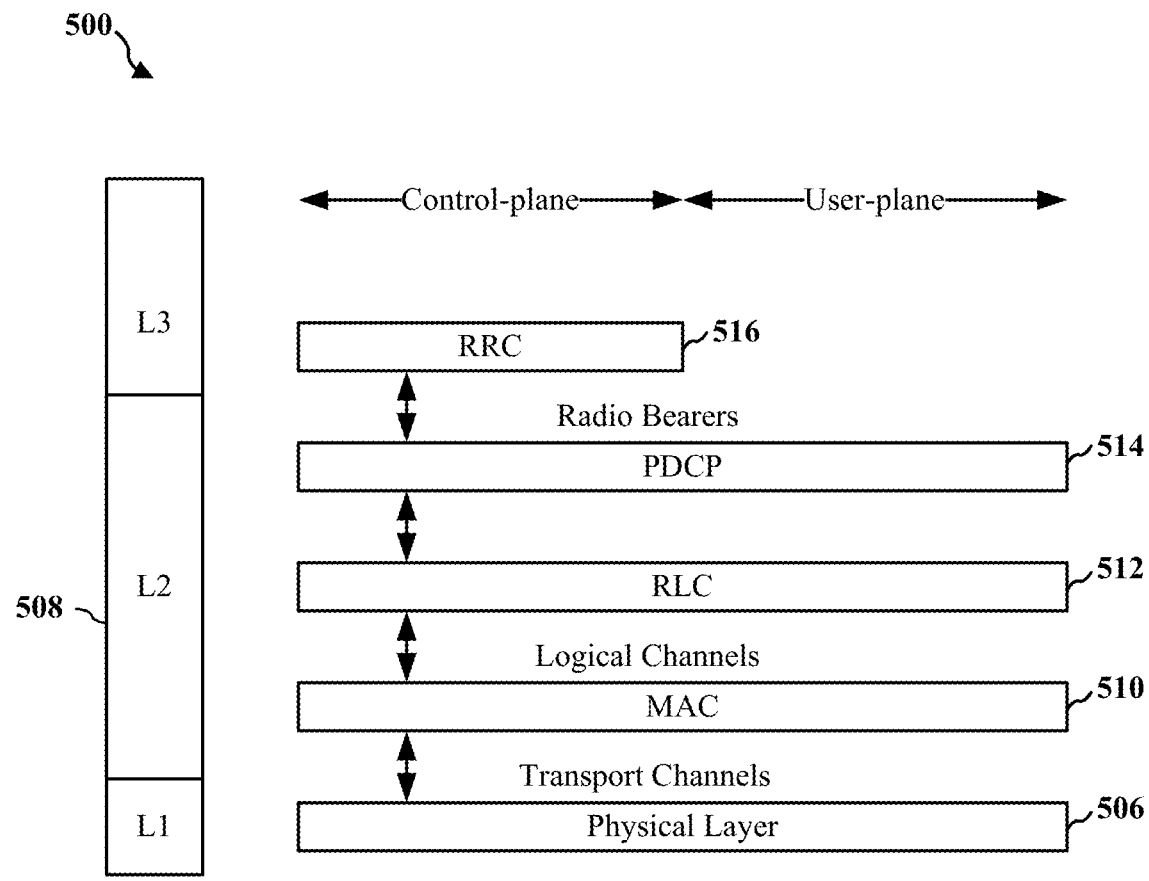
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
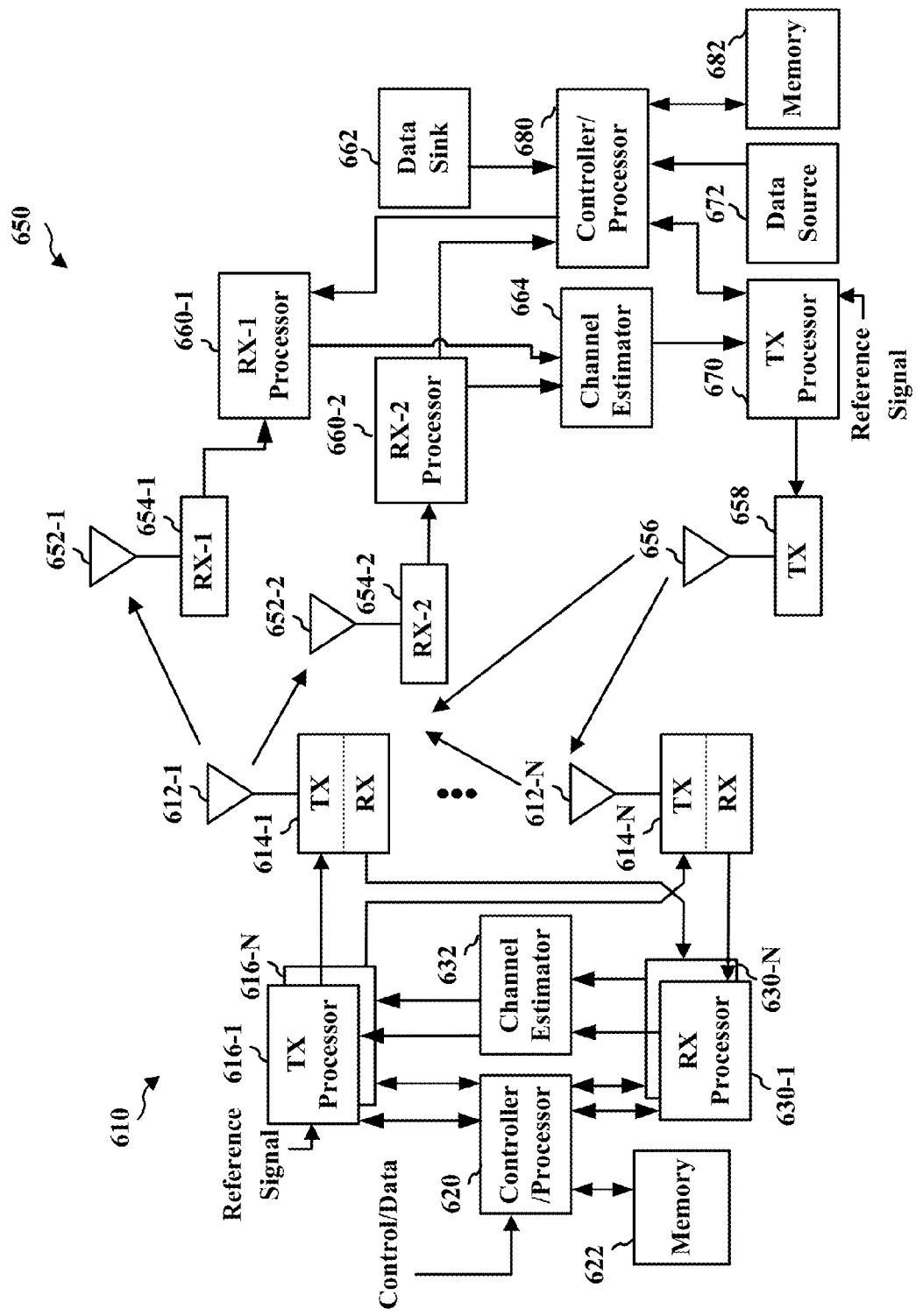
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 612 (612-1, 612-N) via separate transmitters 614 TX (614-1, . . . , 614-N). Each of the transmitters 614 TX modulates an RF carrier with a respective spatial stream for transmission.

At the UE 650, a first receiver 654-1 RX-1 receives a signal through a first antenna 652-1, and a second receiver 654-2 RX-2 receives a signal through a second antenna 652-2. The first receiver 654-1 RX-1 recovers information modulated onto an RF carrier and provides the information to a first receiver (RX-1) processors 660-1. The second receiver 654-2 RX-2 also recovers information modulated onto an RF carrier and provides the information to a second receiver (RX-2) processor 660-2. The RX processors 660 implement various signal processing functions of the L1 layer. The first RX-1 processor 660-1 and the second RX-2 processor perform spatial processing on the information to recover any spatial streams destined for the UE 650. If multiple spatial streams are destined for the UE 650, they may be combined by RX-1 processor 660-1 and the second RX-2 processor into single OFDM symbol streams. The RX-1 processor 660-1 and the second RX-2 processor may then convert the OFDM symbol streams from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 664. The soft decisions are then decoded and de-interleaved to recover the data and control signals that were originally transmitted by the eNodeB 610 on the physical channel. The data and control signals are then provided to the controller/processor 680.

The controller/processor 680 implements the L2 layer. The controller/processor can be associated with a memory 682 that stores program codes and data. The memory 682 may be referred to as a computer-readable medium. In the uplink, the controller/processor 680 provides de-multiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 680 is also responsible for error detection using an acknowledgement (ACK) and/or negative acknowledgement (NACK) protocol to support HARQ operations.

In the uplink, a data source 672 is used to provide upper layer packets to the controller/processor 680. The data source 672 represents all protocol layers above the L2 layer. Similar to the functionality described in connection with the downlink transmission by the eNodeB 610, the controller/processor 680 implements the L2 layer for the user plane and the control plane by providing header compression, ciphering, packet segmentation and reordering, and multiplexing between logical and transport channels based on radio resource allocations by the eNodeB 610. The controller/processor 680 is also responsible for HARQ operations, retransmission of lost packets, and signaling to the eNodeB 610.

Channel estimates derived by a channel estimator 664 from a reference signal or feedback transmitted by the eNodeB 610 may be used by the TX processor 670 to select the appropriate coding and modulation schemes, and to facilitate spatial processing. The spatial streams generated by the TX processor 670 are provided to an antenna 656 via a transmitter 658 TX. The transmitter 658 TX modulates an RF carrier with a respective spatial stream for transmission.

The uplink transmission is processed at the eNodeB 610 in a manner similar to that described in connection with the receiver function at the UE 650. Each of the receivers 614 RX (614-1, . . . , 614-N) receives a signal through its respective antenna 612 (612-1, . . . , 612-N). Each of the receivers 614 RX recovers information modulated onto an RF carrier and provides the information to one of the RX processors 630 (630-1, . . . , 630-N). The RX processors 630 may implement the L1 layer.

The controller/processor 620 implements the L2 layer. The controller/processor 620 can be associated with a memory 622 that stores program codes and data. The memory 622 may be referred to as a computer-readable medium. In the uplink, the controller/processor 620 provides demultiplexing between transport and logical channels, packet reassembly, deciphering, header decompression, control signal processing to recover upper layer packets from the UE 650. Upper layer packets from the controller/processor 620 may be provided to the core network. The controller/processor 620 is also responsible for error detection using an ACK and/or NACK protocol to support HARQ operations The controller/processor 620 and the controller/processor 680 may direct the operation at the eNodeB 610 and the UE 650, respectively. The controller/processor 620 and/or other processors and modules at the eNodeB 610 may perform or direct the execution of various processes for the techniques described herein. The controller/processor 680 and/or other processors and modules at the UE 650 may also perform or direct the execution of the functional blocks illustrated in use in the method flow charts of FIGS. 7-11 and/or other processes for the techniques described involving dual RAT camping within a single radio UE. The memory 632 and the memory 682 may store data and program codes for the eNodeB 610 and the UE 650, respectively.

1X/LTE Dual Domain Camping with a Single Radio UE

One aspect of the present disclosure provides a UE that receives data over a first radio access technology (RAT) and voice over a second radio access technology (RAT) while supporting a single receive path. In this aspect of the disclosure, a single radio UE adaptively shares a first receive chain and a second receive chain of the single receive path between a first radio access technology (RAT) modem and a second RAT modem. In one configuration, the first RAT modem is an LTE modem and the second RAT is a 1x (CDMA2000) modem. CDMA2000 includes but is not limited to single carrier radio transmission technology (1xRTT), 1x evolution-data optimized (1xEV-DO), and other like mobile technology standards that use CDMA channel access for sending voice, data, and signaling data between mobile phones and cell sites. As described herein CDMA2000 may be referred to as 1x. Other configurations of the first and second RAT modems are possible while remaining within the scope of the appended claims and the inventive aspects of the present disclosure. For example the first and second RAT modems could be HSPA and GSM or any other network. The following description is provided with respect to 1x and LTE for ease of illustration.

Simultaneous voice and LTE (SVLTE) is the current de facto standard for voice delivery when LTE is an overlay to a CDMA2000 (1x) network. In SVLTE communication, voice service is deployed as a 1x service that runs in parallel with LTE data services. As a result, a handset runs two radios simultaneously to implement SVLTE communication. Several voice solutions are available to C2K (CDMA2000) operators that are planning on releasing a multimode LTE/C2K handset. These include options that involve network support and/or upgrades including: (1) voice over IP over LTE (VoLTE) and (2) 1x Circuit Switched Fallback (1xCSFB); and options that specify reduced or no network support including: (1) dual receiver 1xCSFB and (2) SVLTE.

The assumption behind options that do not involve network support is that the device either supports dual receive paths or dual receive/dual transmit paths. It should be noted that dual receive paths in an LTE UE implies three receive chains for supporting MIMO (multiple input multiple output) operation in LTE. Dual receive paths enable a UE to independently monitor LTE paging and 1x paging, as specified for supporting dual receiver CSFB communication. Dual receive/dual transmit paths enable a UE to support independent 1x and LTE operation, as specified for supporting SVLTE communication.

One aspect of the present disclosure provides a UE that receives data over LTE and voice over 1x while supporting a single receive path. In this aspect of the disclosure, a single radio UE adaptively shares a single receive path that includes a first receive chain and a second receive chain between a first radio access technology (RAT) modem and a second RAT modem. In one configuration, the single receive path implies two receive chains for supporting MIMO operation in LTE.

Figure 7:
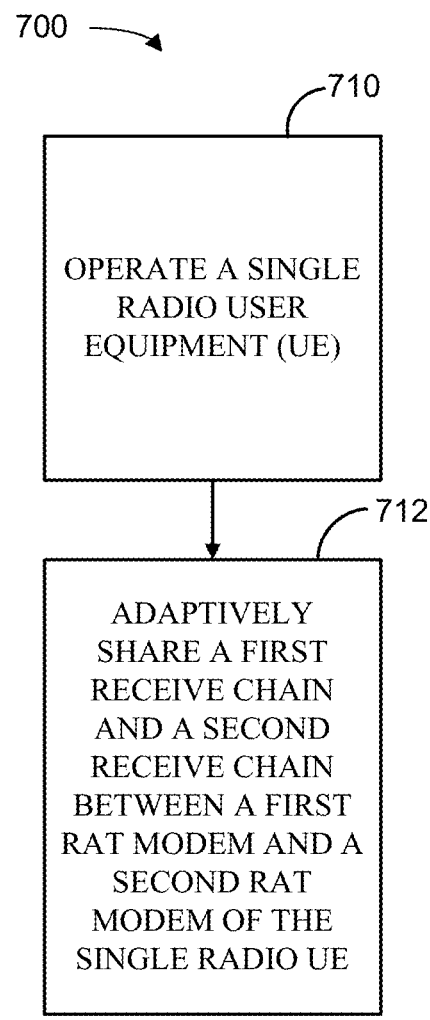
FIG. 7 is a block diagram illustrating a method for 1x/LTE dual domain camping with a single radio UE according to an aspect of the present disclosure.

FIG. 7 illustrates a method 700 for dual RAT camping with a single radio user equipment (UE) according to an aspect of the present disclosure. As described herein, a single radio UE may refer to a UE that includes a first RAT (e.g., an LTE modem) and a second RAT (e.g., a 1x modem) that share a single receive path. In one aspect of the present disclosure, a primary (first) receive chain and a diversity (second) receive chain are shared between the LTE modem and the 1x modem of the single radio UE. For example, as shown in FIG. 6, a first receiver 654-1 RX-1 has a first antenna 652-1 and a second receiver 654-2 RX-2 has a second antenna 652-2 that are shared by the UE 650 between the first and second RATs of the UE 650.

In one configuration, the sharing of the primary (first receiver 654-1 RX-1) and diversity (second receiver 654-2 RX-2) receive chains of the single radio UE 650 prohibits camping on both an LTE network and a 1x network. As a result, 1x pages and LTE pages may collide during operation of the single radio UE 650. As further described, the tune-away from LTE to listen for 1x pages or other like 1x activity is referred to as a "1x tune away". The 1x tune away results from sharing of the primary and diversity receive chains to simulate a dual radio device that adaptively shares the primary and diversity receive chains to enable reception of LTE data and 1x voice calls.

Referring to FIG. 7, in block 710, a single radio UE 650 is operated. In block 712, the UE 650 adaptively shares a first (primary) receive chain and a second (diversity) receive chain between a first RAT (e.g., an LTE modem) and a second RAT (e.g., a 1x modem) of the single radio UE 650. In this configuration, a 1x tune-away may be performed without an LTE suspend request. In this configuration, the second receive chain is assigned to the 1x modem to detect a 1x page while the LTE modem uses the first receive chain in an LTE connected mode. In a further configuration, LTE is suspended during a 1x voice call using the first receive chain while in a 1x connected mode. In this configuration, the second receive chain is assigned to the LTE modem when a 1x mobile diversity receiver is disabled.

A single radio UE 650, according to one configuration, adaptively shares the primary (first) and diversity (second) receive chains to reduce paging collisions between LTE and 1x. An issue that arises due to the receive path limitation of the single radio UE is the complexity in dealing with the cases in which the 1x and LTE page wakeups collide. This can happen because the two networks operate independently of each other. As a result, the assigned 1x wakeup slot and LTE DRX (discontinuous reception) slot could collide.

One way to address this issue is to sacrifice the first or second receive chain on LTE if there is an overlapping 1x page wakeup. In this scenario, the second receive chain on LTE is used for 1x. A disadvantage of sacrificing the second receive chain on LTE for 1x is that LTE paging performance is degraded as compared to LTE only operation, which uses both the first and second receive chains. Although, the assigned 1x wakeup slot and LTE DRX slot could collide, an LTE DRX cycle has a maximum value of 2.56 seconds. Most 1x operations, by contrast, specify a 5.12 second page wakeup cycle. As a result, even under a worst-case scenario, the collisions between 1x and LTE paging wakeups affect one out of every two LTE wakeups. Potential solutions for reducing the impact of 1x and LTE paging wakeup collision are described below.

One workaround for decreasing the impact of receive path sharing when both LTE and 1x are idle may be performed as follows. In one aspect of the disclosure, the impact of sharing the receive path within a single radio UE is reduced by decreasing the time in which the second receive chain (e.g., the LTE diversity receive chain) is used by the 1x modem. In one UE configuration, offline cell search is performed based on UE samples collected during use of the second receive chain for 1x modem operation ("1x connected mode"). In this configuration, the UE collected samples are decoded while the 1x modem is idle or otherwise does not use the first or second receive chains. Such a cell search will be referred to as a partially offline cell search.

For example, as shown in FIG. 6, the observed samples are processed by one of the RX processors 660 and/or the channel estimator 664 offline by attempting a 1x decode on multiple sampled pseudo noise (PN) sequences for identifying, for example, a reverse channel. The offline processing enables multiple PN sequence decodes without increasing a tune-away time from LTE. The offline processing may include, but is not limited to, a 1x idle mode, an LTE idle mode or other like mode in which the 1x modem does not use the first or second receive chains.

In another UE configuration, online 1x decoding is performed without monitoring a QPCH (Quick Paging Channel). Normally, an early wakeup is performed by the 1x modem to monitor the QPCH. In this UE configuration, the 1x modem does not wake in advance to monitor the QPCH. Rather, the 1x modem may monitor a paging slot and not the quick paging indicators to avoid extended wakeups. Avoiding extended wakeups reduces the amount of time in which the 1x modem is online and using the first and/or second receive chains. In another UE configuration, the QPCH is avoided to reduce LTE and 1x paging collisions. Instead, the 1x modem may adaptively decide whether to monitor the QPCH. For example, the 1x modem avoids monitoring the QPCH if it collides with an LTE DRX wake up cycle.

Figure 8:
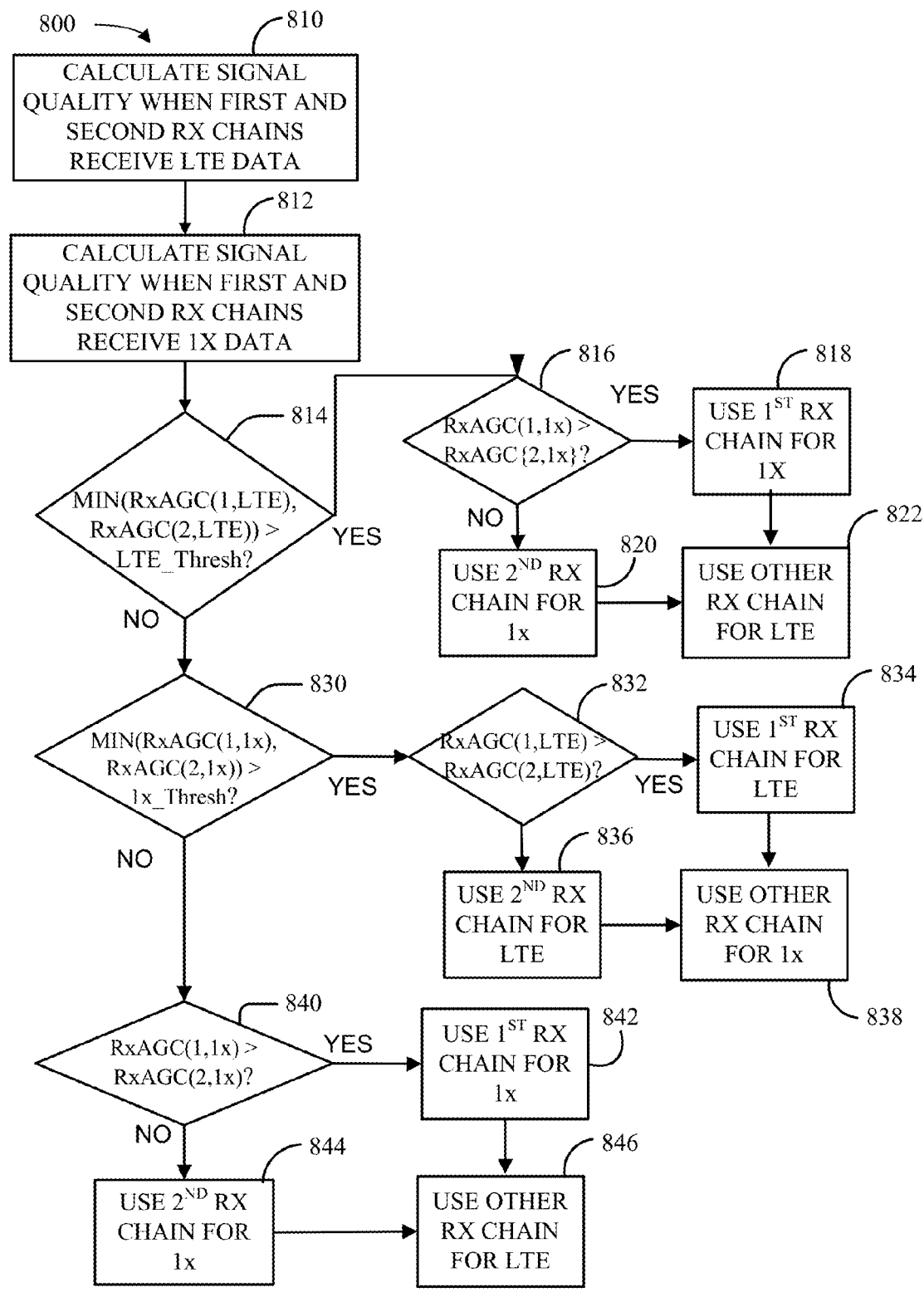
FIG. 8 is a block diagram illustrating a method for 1x/LTE dual domain camping with a single radio UE using dynamic receive chain assignment according to an aspect of the present disclosure.

FIG. 8 illustrates a method 800 for dual RAT camping with a single radio UE 650 according to an aspect of the present disclosure. In this aspect of the disclosure, the impact of receive path sharing between LTE and 1x modems is decreased by dynamically assigning the first and second receive chains of the single receive path between 1x and LTE. In this configuration, the first and second receive chains are dynamically assigned between 1x and LTE to increase and/or maximize the probability that both LTE and 1x page reception succeeds. The UE may wake-up ahead of an actual page arrival time to perform the method 800 for dynamically assigning the first and second receive chains between LTE and 1x. The receive chain with the highest receive automatic gain control (AGC) is assigned to 1x. If both receive AGCs are strong, the better receive AGC is assigned to LTE.

Referring to FIG. 8, an exemplary process is now explained in more detail. In block 810, a signal quality is calculated when the first and second receive chains receive data in an LTE connected mode. In this configuration, a receiver automatic gain control (RxAGC) measures a signal quality in the LTE connected mode using the first receive chain (RxAGC (1,LTE)) and the second receive chain (RxAGC(2,LTE)). It should be recognized, however, that other signal quality measurements are possible while remaining within the scope of the described inventive aspects. At block 812, a signal quality is calculated when the first and second receive chains receive data in a 1x connected mode. In this configuration, a receiver automatic gain control (RxAGC) also measures a signal quality in the 1x connected mode using the first receive chain (RxAGC(1,1x)) and the second receive chain (RxAGC(2, 1x)).

At block 814, a minimum value between the measured signal quality in the LTE connected mode using the first receive chain (RxAGC(1,LTE)) and the second receive chain (RxAGC(2,LTE)) is compared to a predetermined LTE threshold (LTE_Thresh).

When the minimum is greater than the threshold, block 816 is performed. At block 816, the measured signal quality for the 1x connected mode using the first receive chain (RxAGC(1,1x)) and the second receive chain (RxAGC(2,1x)) are compared.

When the measured signal quality for the 1x connected mode using the first receive chain (RxAGC(1,1x)) is greater than the second receive chain (RxAGC(2,1x)), block 818 is performed. At block 818, the first receive chain is used for 1x and at block 822 the second receive chain is used for LTE. Otherwise, at block 820, the second receive chain is used for 1x and at block 822 the first receive chain is used for LTE. In this configuration, the receive chain with the highest receiver automatic gain control is as assigned to 1x, with the other receive chain assigned to LTE.

When the minimum is less than the threshold at block 814, block 830 is performed. At block 830, a minimum value between the measured signal quality for the 1x connected mode using the first receive chain (RxAGC(1,1x)) and the second receive chain (RxAGC(2,1x)) is compared to a predetermined 1x threshold (1x_Thresh).

When the minimum value between the measured signal quality for the 1x connected mode using the first receive chain (RxAGC(1,1x)) and the second receive chain (RxAGC(2,1x)) is greater than the predetermined 1x threshold (1x_Thresh)e, block 832 is performed. At block 832, the measured signal quality for the LTE connected mode using the first receive chain (RxAGC(1,LTE)) and the second receive chain (RxAGC(2,LTE)) are compared.

When the first value exceeds the second value, block 834 is performed. At block 834, the first receive chain is used for LTE and at block 838 the second receive chain is used for 1x. Otherwise, at block 836, the second receive chain is used for LTE and at block 838 the first receive chain is used for 1x. In this configuration, the receive chain with the highest signal quality is assigned to LTE because the signal quality for both receive chains in the 1x connected mode is greater than the predetermined 1x threshold. That is, the receive chain with the highest receiver automatic gain control is assigned to LTE, with the other receive chain assigned to 1x.

When the minimum value between the measured signal quality for the 1x connected mode using the first receive chain (RxAGC(1,1x)) and the second receive chain (RxAGC(2,1x)) is less than the predetermined 1x threshold (1x_Thresh), block 840 is performed. At block 840, the measured signal quality for the 1x connected mode using the first receive chain (RxAGC(1,1x)) and the second receive chain (RxAGC(2,1x)) is compared.

When the measured signal quality for the 1x connected mode using the first receive chain (RxAGC(1,1x)) is greater than the second receive chain (RxAGC(2,1x)), block 842 is performed. At block 842, the first receive chain is used for 1x and at block 846 the second receive chain is used for LTE. Otherwise, at block 844, the second receive chain is used for 1x and at block 846 the first receive chain is used for LTE. In this configuration, a maximum value between the measured signal quality for the 1x connected mode using the first receive chain (RxAGC(1,1x)) and the second receive chain (RxAGC(2,1x)) is compared to the predetermined 1x threshold (1x_Thresh).

When the maximum value between the measured signal quality for the 1x connected mode using the first receive chain (RxAGC(1,1x)) and the second receive chain (RxAGC(2,1x)) is greater than the predetermined 1x threshold (1x_Thresh), 1x quick paging is disabled because the 1x connected mode signal quality is below the predetermined 1x threshold. For example, as shown in FIG. 6, one of the RX processors 660 may calculate the signal quality for the 1x connected mode and the LTE connected modem using the first and second receive chains. As further shown in FIG. 6, the controller/processor 680 may perform the receive chain assignment process of FIG. 8.

In a further configuration, an antenna selection between LTE and 1x is based on historic radio frequency (RF) conditions. For example, if the historic RF conditions (e.g., last three wakeups) are sufficiently good, the antenna selection process assigns the first and second receive chains based on past performance, which reduces the wakeup for performing the antenna selection of FIG. 8 in challenging RF conditions. If the historic RF conditions are insufficient, then the best available receive chain may be assigned to 1x.

As noted, a single receive chain UE, according to one configuration, adaptively shares the first and second receive chains to reduce paging collisions between LTE and 1x. Because the two networks operate independently, the assigned 1x wakeup slot and LTE DRX (discontinuous reception) slot could collide. In one configuration, a dynamic DRX-cycle modification is provided, for example, to increase a DRX cycle so that a percentage of LTE pages affected by sharing of the first and second receive chains is reduced. For example, if a DRX cycle is 2.56 seconds and 1x paging cycle is 5.12 seconds, one out of every two LTE wakeups are affected by a 1x paging wakeup. If, however, the DRX cycle is increased to 1.28 seconds, one out of every four LTE wakeups are affected by a 1x paging wakeup.

Figure 9:
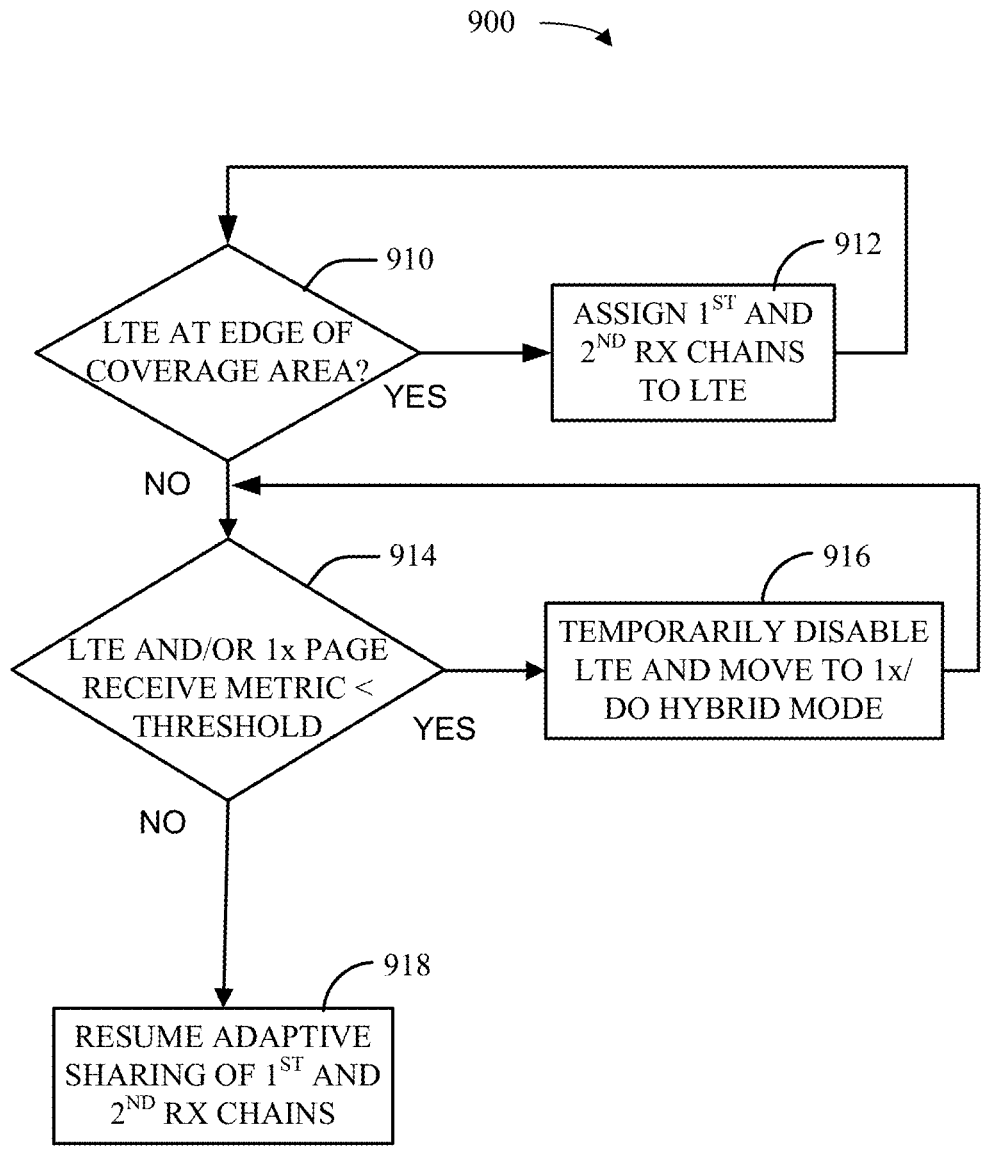
FIG. 9 is a block diagram illustrating a method for 1x/LTE dual domain camping with a single radio UE to avoid 1x and LTE paging collisions according to an aspect of the present disclosure.

FIG. 9 illustrates a method 900 for dual RAT camping with a single radio UE according to another aspect of the present disclosure. At block 910, it is determined whether the LTE modem is at an edge of a coverage area. For example, as shown in FIG. 2, a UE 206 may be at the edge of a cell 202. When the LTE modem is at the edge of a coverage area, the first and second receive chains are assigned to the LTE modem at block 912. In this configuration, the LTE modem is given both receive chains from time to time when the LTE modem is at the edge of coverage. As a result, 1x pages are sacrificed to improve LTE operation when the UE is at the edge of LTE coverage.

In this configuration, detection of whether the UE is at the edge of LTE coverage is determined according to a percentage of time when LTE page reception fails. LTE page reception failure may be caused by erasures. LTE edge coverage may also be detected based on a reference signal received power (RSRP) and/or a reference signal received quality (RSRQ). For example, as shown in FIG. 6, the RX processors 660 and/or the controller/processor 680 may detect whether the UE 650 is at the edge of a coverage area and perform the receive chain assignment as described in FIG. 9.

At block 914, it is determined whether LTE and/or 1x page reception metrics fall below a predetermined threshold when the UE is not at the LTE coverage boundary. When the LTE and/or 1x page reception metrics fall below the predetermined threshold, LTE is temporarily disabled and the UE transitions to, for example, a 1x/DO (data only) hybrid mode at block 916. The 1x/DO hybrid mode may enable a connection to both an EV-DO network and a CDMA network, while maintaining registration and overhead information on both types of networks concurrently.

In this configuration, during operation in the 1x/DO hybrid mode, the UE can negotiate a slot cycle over EV-DO to receive data over EV-DO. In this configuration, a parameter (e.g., T_SLTE_avoid) is specified for determining a period in which LTE is suspended. For example, the parameter T_SLTE_avoid may specify a default LTE avoidance time of two minutes. Otherwise, adaptive sharing of the first and second receive chains between LTE and 1x resumes at block 918. In an alternative aspect of the disclosure, the LTE standard is enhanced by allowing the UE 650 to specify a preferred wakeup slot, for example, by negotiating paging wakeup instants to avoid collisions with 1x paging wakeups.

Figure 10:
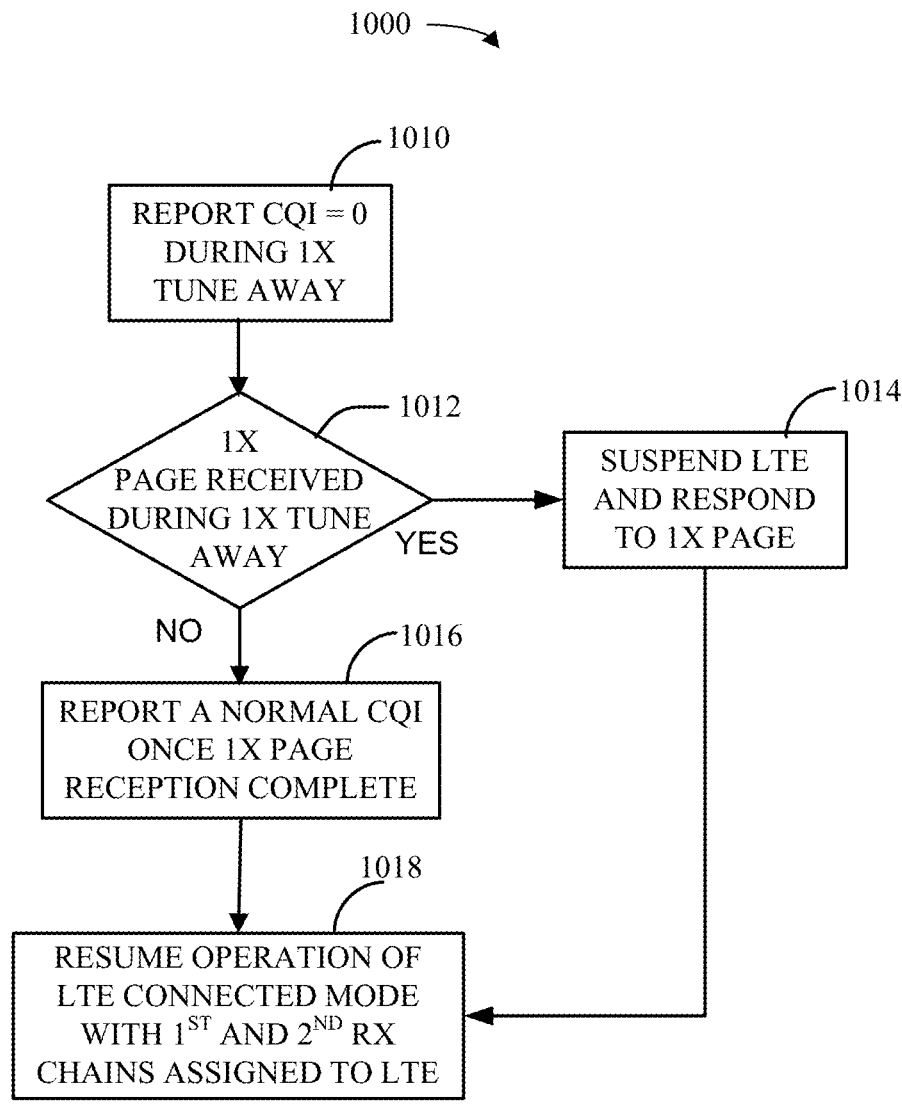
FIG. 10 is a block diagram illustrating a method for 1x/LTE dual domain camping with a single radio UE during LTE connected mode and 1x idle mode according to an aspect of the present disclosure.

FIG. 10 illustrates a method 1000 for dual RAT camping within a single radio UE during LTE connected mode and 1x idle mode according to an aspect of the present disclosure. In this configuration, sharing of the first and second receive chains between LTE and 1x involves continued UE monitoring for 1x pages while LTE is in the connected mode. The UE continues monitoring for 1x pages while LTE is in the connected mode by tuning away one of the first and second receive chains for 1x page reception, which is performed according to the method 1000 of FIG. 10.

At block 1010, the single radio UE 650 reports a poor channel quality indicator (CQI) (e.g., CQI=0) before tuning away to 1x for 1x page reception. In this configuration, the poor CQI is reported to an eNodeB 610 to increase the probability that the eNodeB 610 does not serve the UE 650 in response to the poor CQI. For example, as shown in FIG. 6, the eNodeB 610 will most likely not schedule data for the UE 650 due to the reported poor CQI, thereby reducing the probability of lost data during the 1x tune away. At block 1012, it is determined whether a 1x page is received during the 1x tune away. When a 1x page is received during the 1x tune away, LTE is suspended and the UE responds to the 1x page at block 1014. In this configuration, the LTE stack is suspended, which is identified by the serving eNodeB 610 as a radio link failure (RLF). In another configuration, an ESR (extended service request) is transmitted to the serving eNodeB 610 before suspending the LTE stack and responding to the 1x page to cause the LTE shutdown.

When a 1x page is not received during the 1x tune away, a normal CQI is reported once the 1x page reception is complete at block 1016. In an alternative configuration, the single radio UE 650 temporarily boosts the CQI to cause the serving eNodeB 610 to ramp-up more quickly, thereby expediting a return to LTE connected mode. At block 1018, the UE resumes LTE connected mode operation with the first and second receive chains assigned to the LTE modem.

In another aspect of the disclosure, the network configures a CDRX (connected mode DRX) that allows the single radio UE 650 to tune-away for 1x pages. In the connected mode DRX, the network buffers any received data during the 1x tune away. In this configuration, the 1x pages are lower priority than the LTE data and are retrieved on a 'best effort' basis, but without impacting the LTE data.

In a further aspect of the disclosure, the UE operates as a single rank device (i.e., uses only one receive path) during the 1x tune away. In this configuration, when data can be received using one receive path, the UE operates as a single rank device, such that the LTE data is received, if possible, with the single rank. Otherwise the LTE data is lost because it cannot be received with the single rank.

Figure 11:
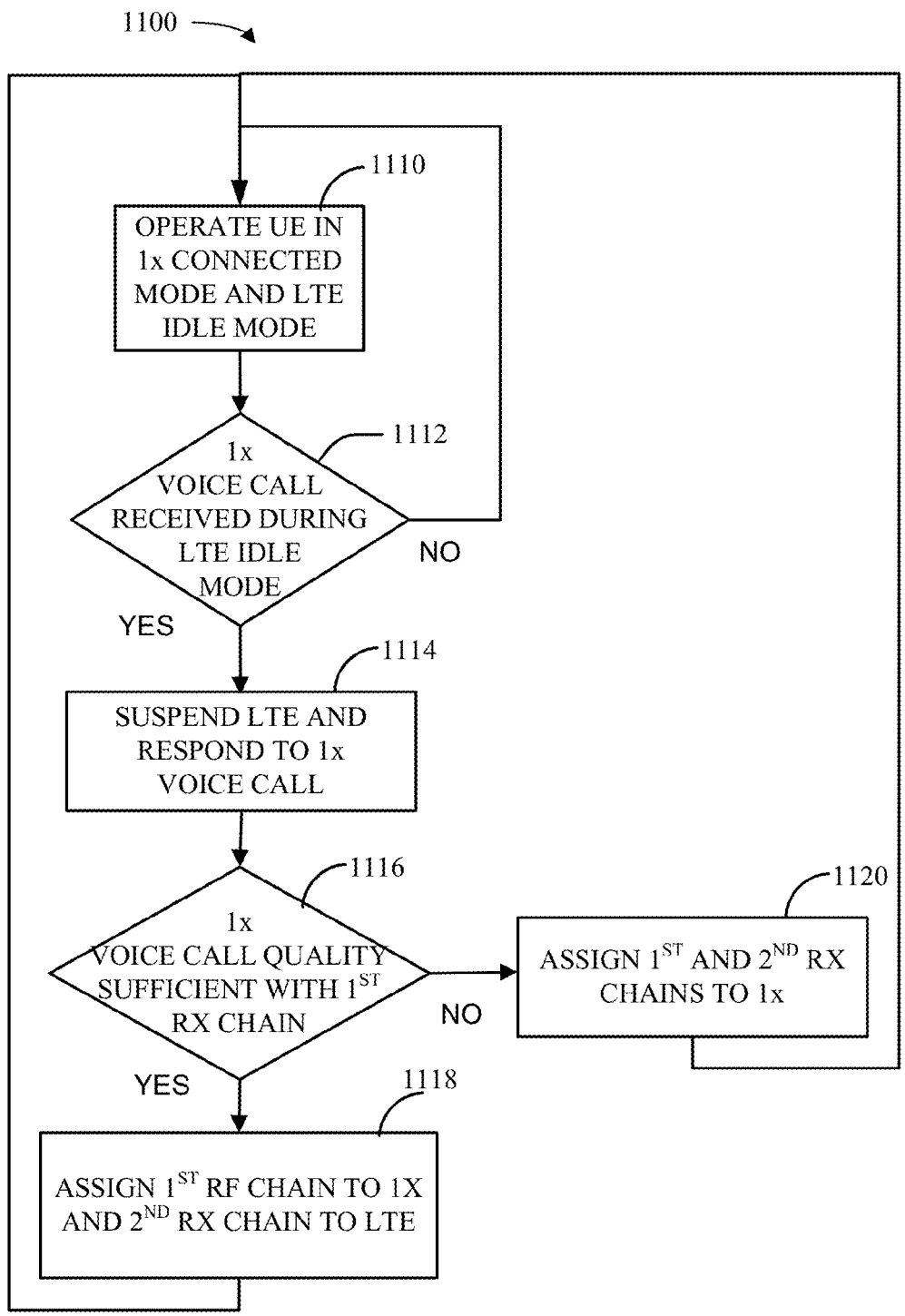
FIG. 11 is a block diagram illustrating a method for 1x/LTE dual domain camping with a single radio UE during 1x connected mode and LTE idle mode according to an aspect of the present disclosure.

FIG. 11 is a block diagram illustrating a method 1100 for 1x/LTE dual domain camping with a single radio UE during 1x connected mode and LTE idle mode according to an aspect of the present disclosure. In this configuration, sharing of the first and second receive chains between LTE and 1x is performed while 1x is in connected mode and LTE is in idle mode at block 1110. When 1x is in connected mode and LTE is in idle mode, it is assumed that 1x voice is more important than LTE data. At block 1112, it is determined whether a 1x voice call is received during LTE idle mode. When a 1x voice call is received during the LTE idle mode, LTE is suspended during the 1x voice call at block 1114. According to this configuration, LTE is suspended during 1x voice calls to avoid any degradation in 1x voice quality. When LTE is suspended during 1x voice call, the first and second receive chains may be assigned to the 1x modem to enable 1x receiver diversity.

At block 1116, it is determined whether 1x voice quality is sufficient using a single receive chain. When 1x voice quality is sufficient using the single receive chain, then the other receive chain is assigned to the LTE modem at block 1118. In this configuration, LTE is suspended during the 1x voice call using the first receive chain while in a 1x connected mode. The second receive chain, however, may be assigned to the LTE modem when the 1x mobile diversity receiver is disabled. Otherwise both the first and second receive chains are assigned to 1x at block 1120.

In a further configuration, the UE uses one of the receive chains to stay camped on LTE from a lower layer perspective. Staying camped on a lower LTE layer enables faster resumption of LTE once the 1x voice call is completed. In this configuration, camping on the lower LTE layer is performed on an opportunistic basis when the 1x mobile receive diversity is disabled. Suspending of LTE during voice calls may be performed by sending an extended service request (ESR) over LTE to suspend the LTE context prior to the 1x call origination/1x page response. Transmission of the ESR over LTE prior to the 1x call origination/1x page response should not affect network statistics.

Figure 12:
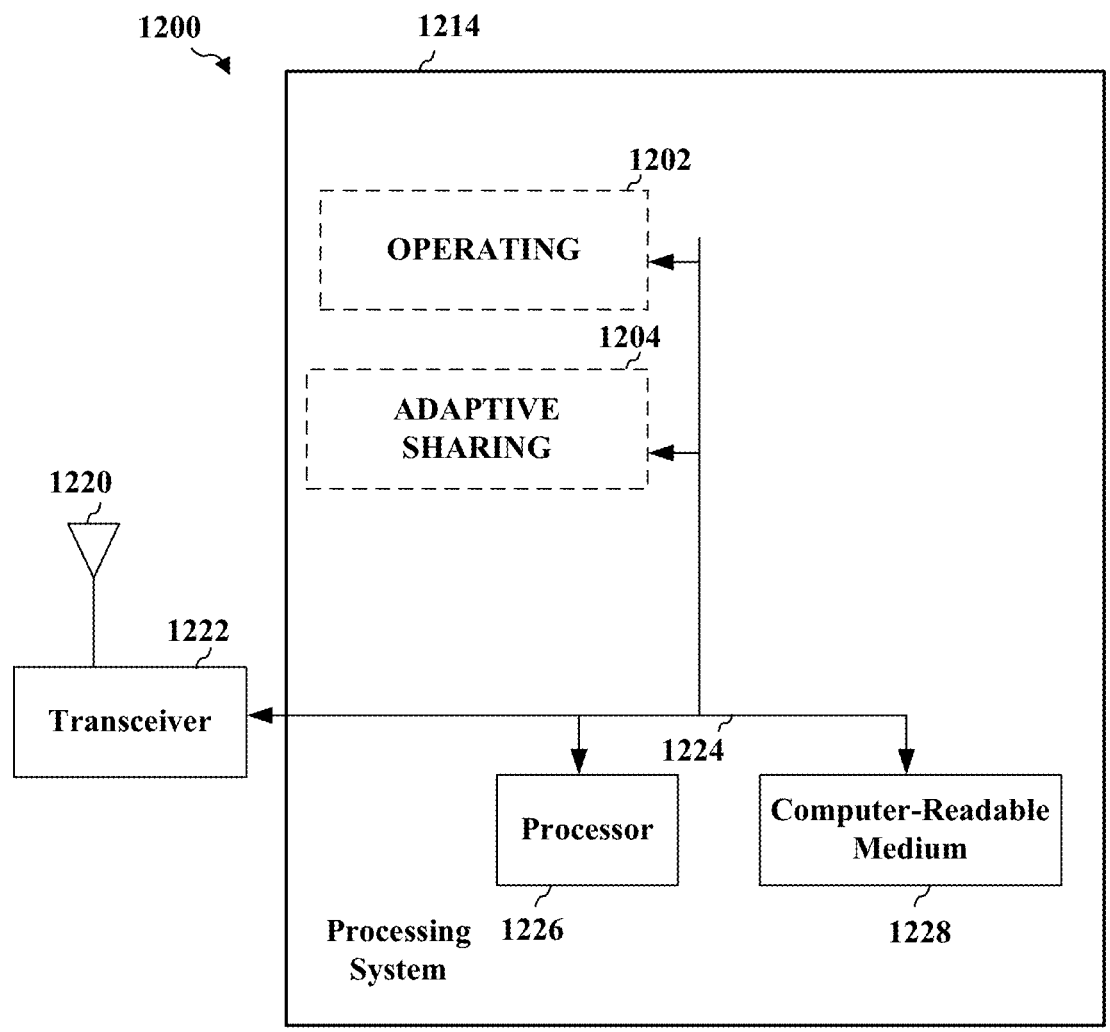
FIG. 12 is a diagram illustrating an example of a hardware implementation for an apparatus employing a single radio UE within a 1x/LTE dual domain camping system according to one aspect of the present disclosure.

FIG. 12 is a diagram illustrating an example of a hardware implementation for an apparatus 1200 employing a 1x/LTE dual domain camping system according to one aspect of the present disclosure. The 1x/LTE dual domain camping system 1214 may be implemented with a bus architecture, represented generally by a bus 1224. The bus 1224 may include any number of interconnecting buses and bridges depending on the specific application of the 1x/LTE dual domain camping system 1214 and the overall design constraints. The bus 1224 links together various circuits including one or more processors and/or hardware modules, represented by a processor 1226, an operating module 1202, an adaptive sharing module 1204, and a computer-readable medium 1228. The bus 1224 may also link various other circuits such as timing sources, peripherals, voltage regulators, and power management circuits, which are well known in the art, and therefore, will not be described any further.

The apparatus includes the 1x/LTE dual domain camping system 1214 coupled to a transceiver 1222. The transceiver 1222 is coupled to one or more antennas 1220. The transceiver 1222 provides a means for communicating with various other apparatus over a transmission medium. The 1x/LTE dual domain camping system 1214 includes the processor 1226 coupled to the computer-readable medium 1228. The processor 1226 is responsible for general processing, including the execution of software stored on the computer-readable medium 1228. The software, when executed by the processor 1226, causes the 1x/LTE dual domain camping system 1214 to perform the various functions described supra for any particular apparatus. The computer-readable medium 1228 may also be used for storing data that is manipulated by the processor 1226 when executing software.

The 1x/LTE dual domain camping system 1214 further includes the operating module 1202 for operating a single radio UE and the adaptive sharing module 1204 for adaptively sharing a first receive chain and a second receive chain between a first radio access technology (RAT) modem and a second RAT modem of the single radio UE. The operating module 1202 and the adaptive sharing module 1204 may be software modules running in the processor 1226, resident/stored in the computer-readable medium 1228, one or more hardware modules coupled to the processor 1226, or some combination thereof. The 1x/LTE dual domain camping system 1214 may be a component of the single radio UE 650.

In one configuration, the apparatus 1200 for wireless communication includes means for operating and means for adaptively sharing. The means may be the operating module 1202, the adaptive sharing module 1204 and/or the 1x/LTE dual domain camping system 1214 of the apparatus 1200 configured to perform the functions recited by the operating means and the adaptive sharing means. In one aspect of the present disclosure, the operating means may be the controller/processor 680 and/or memory 682 configured to perform the functions recited by the operating means. In this aspect of the disclosure, the adaptive sharing means may be the controller/processor 680 and/or memory 682, one of the receive processors 660, the transmit TX processor 670, and/or the first receiver 654-1 RX-1 and/or the second receiver 654-2 RX-2 configured to perform the functions recited by the adaptive sharing means. In another aspect, the aforementioned means may be any module or any apparatus configured to perform the functions recited by the aforementioned means.

The examples above describe aspects implemented in LTE and 1x systems. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication within a single radio user equipment (UE), comprising:
   adaptively sharing a first receive chain and a second receive chain between a first radio access technology (RAT) modem and a second RAT modem of the single radio UE, by assigning a best available receive chain to the second RAT modem when historic radio frequency (RF) conditions are below a predetermined level.

2. The method of claim 1, further comprising:
   performing a second RAT cell search partially offline while the first RAT modem uses the first receive chain and the second receive chain.

3. The method of claim 1, further comprising:
   decoding a paging indicator without waking in advance.

4. The method of claim 1, in which adaptively sharing comprises:
   assigning the first receive chain to the second RAT modem when a signal quality of the first receive chain is greater than a signal quality of the second receive chain.

5. The method of claim 1, in which adaptively sharing comprises:
   assigning the first receive chain to the first RAT modem when a signal quality of the first receive chain is greater than a signal quality of the second receive chain and signal qualities of the first and second receive chain are greater than a predetermined value.

6. The method of claim 1, in which adaptively sharing is based on the historic radio frequency conditions.

7. The method of claim 1, further comprising:
   increasing a first RAT discontinuous reception (DRX) cycle prior to performing a second RAT tune away to monitor for a second RAT page.

8. The method of claim 1, in which the adaptive sharing comprises:
periodically assigning the first receive chain and the second receive chain to the first RAT modem when the single radio UE is at or near an edge of a first RAT network.

9. The method of claim 1, in which adaptively sharing comprises:
transitioning from the first RAT to a second RAT hybrid mode that communicates over a plurality of RATs when first RAT and second RAT page reception degrade below a predetermined level, the second RAT hybrid mode enabling data and voice communication.

10. The method of claim 1, further comprising:
specifying a preferred wakeup slot to avoid collisions between second RAT pages and first RAT pages.

11. The method of claim 1, in which adaptively sharing comprises:
assigning the second receive chain to the second RAT modem to detect a second RAT page while the first RAT modem uses the first receive chain when in a first RAT connected mode.

12. The method of claim 1, further comprising:
reporting an unsatisfactory channel quality prior to performing a second RAT tune away to monitor for a second RAT page while in the first RAT connected mode.

13. The method of claim 12, further comprising:
increasing reported channel quality by a predetermined amount to ramp-up a return to the first RAT connected mode when the second RAT page is undetected during the second RAT tune away.

14. The method of claim 1, in which adaptively sharing comprises:
suspending the first RAT when a second RAT page is received during a second RAT-tune away; and
responding to the second RAT page using the first receive chain and the second receive chain.

15. The method of claim 14, in which suspending the first RAT further comprises:
suspending a first RAT stack to invoke a radio link failure.

16. The method of claim 14, in which suspending the first RAT further comprises:
issuing a request prior to suspending a first RAT stack.

17. The method of claim 1, further comprising configuring a connected mode discontinuous reception (DRX) cycle to buffer the first RAT during a second RAT-tune away when in a first RAT connected mode.

18. The method of claim 1, in which adaptively sharing comprises operating as a single rank device during a second RAT tune away while in a first RAT connected mode.

19. The method of claim 1, in which adaptively sharing comprises:
suspending the first RAT during a second RAT voice call using the first receive chain in a second RAT connected mode; and
assigning the second receive chain to the first RAT modem.

20. The method of claim 19, further comprising issuing a request to suspend a first RAT context prior to suspending the first RAT.

21. The method of claim 1, in which the first RAT comprises long term evolution (LTE) and the second RAT comprises CDMA2000.

22. An apparatus for wireless communication within a single radio user equipment (UE), comprising:
means for operating the single radio UE; and
means for adaptively sharing a first receive chain and a second receive chain between a first radio access technology (RAT) modem and a second RAT modem of the single radio UE, by assigning a best available receive chain to the second RAT modem when historic radio frequency conditions are below a predetermined level.

23. A computer program product configured for wireless communication within a single radio user equipment (UE), the computer program product comprising:
a computer-readable medium having non-transitory program code recorded thereon, the program code comprising:
program code to adaptively share a first receive chain and a second receive chain between a first radio access technology (RAT) modem and a second RAT modem of the single radio UE, by assigning a best available receive chain to the second RAT modem when historic radio frequency conditions are below a predetermined level.

24. An apparatus configured for wireless communication within a single radio user equipment (UE), the apparatus comprising:
a memory; and
at least one processor coupled to the memory, the at least one processor being configured:
to adaptively share a first receive chain and a second receive chain between a first radio access technology (RAT) modem and a second RAT modem of the single radio UE, by assigning a best available receive chain to the second RAT modem when historic radio frequency conditions are below a predetermined level.

25. The apparatus of claim 24, in which the processor is further configured to:
perform a second RAT cell search partially offline while the first RAT modem uses the first receive chain and the second receive chain.

26. The apparatus of claim 24, in which the processor is further configured to:
decode a paging indicator without waking in advance.

27. The apparatus of claim 24, in which the processor is further configured to adaptively share by:
assigning the first receive chain to the second RAT modem when a signal quality of the first receive chain is greater than a signal quality of the second receive chain.

28. The apparatus of claim 24, in which the processor is further configured to adaptively share by:
assigning the first receive chain to the first RAT modem when a signal quality of the first receive chain is greater than a signal quality of the second receive chain and signal qualities of the first and second receive chain are greater than a predetermined value.

29. The apparatus of claim 24, in which the processor is further configured to adaptively share based on the historic radio frequency conditions.

30. The apparatus of claim 24, in which the processor is further configured to:
increase a first RAT discontinuous reception (DRX) cycle prior to performing a second RAT tune away to monitor for a second RAT page.

31. The method of claim 1, in which the adaptive sharing comprises
periodically assigning the first receive chain and the second receive chain to the first RAT modem when the single radio UE is at or near an edge of a first RAT network.

32. The apparatus of claim 24, in which the processor is further configured to adaptively share by:
transitioning from the first RAT to a second RAT hybrid mode that communicates over a plurality of RATs when first RAT and second RAT page reception degrade below a predetermined level, the second RAT hybrid mode enabling data and voice communication.

33. The apparatus of claim 24, in which the processor is further configured to:
specify a preferred wakeup slot to avoid collisions between second RAT pages and first RAT pages.

34. The apparatus of claim 24, in which the processor is further configured to adaptively share by:
assigning the second receive chain to the second RAT modem to detect a second RAT page while the first RAT modem uses the first receive chain when in a first RAT connected mode.

35. The apparatus of claim 34, in which the processor is further configured to:
report an unsatisfactory channel quality prior to performing a second RAT tune away to monitor for a second RAT page while in the first RAT connected mode.

36. The apparatus of claim 35, in which the processor is further configured to:
increase reported channel quality by a predetermined amount to ramp-up a return to the first RAT connected mode when the second RAT page is undetected during the second RAT tune away.

37. The apparatus of claim 24, in which the processor is further configured to adaptively share by:
suspending the first RAT when a second RAT page is received during a second RAT-tune away; and
responding to the second RAT page using the first receive chain and the second receive chain.

38. The apparatus of claim 37, in which the processor is further configured to suspend the first RAT further by:
suspending a first RAT stack to invoke a radio link failure.

39. The apparatus of claim 37, in which the processor is further configured to suspend the first RAT by:
issuing a request prior to suspending a first RAT stack.

40. The apparatus of claim 24, in which the processor is further configured to configure a connected mode discontinuous reception (DRX) cycle to buffer the first RAT during a second RAT-tune away when in a first RAT connected mode.

41. The apparatus of claim 24, in which the processor is further configured to adaptively share by operating as a single rank device during a second RAT tune away while in a first RAT connected mode.

42. The apparatus of claim 24, in which the processor is further configured to adaptively share by:
suspending the first RAT during a second RAT voice call using the first receive chain in a second RAT connected mode; and
assigning the second receive chain to the first RAT modem.

43. The apparatus of claim 42, in which the processor is further configured to issue a request to suspend a first RAT context prior to suspending the first RAT.

44. The apparatus of claim 24, in which the first RAT comprises long term evolution (LTE) and the second RAT comprises CDMA2000.

* * * * *